(12) United States Patent
Hinterberger et al.

(10) Patent No.: US 8,355,031 B2
(45) Date of Patent: Jan. 15, 2013

(54) PORTABLE ELECTRONIC DEVICES WITH ADJUSTABLE DISPLAY ORIENTATION

(75) Inventors: David Hinterberger, Fairport, NY (US); Matthew R. Fallows, Fairport, NY (US); Tibor Dobri, Holley, NY (US)

(73) Assignee: Harris Corporation, Melbourne, FL (US)

( * ) Notice: Subject to any disclaimer, the term of this patent is extended or adjusted under 35 U.S.C. 154(b) by 432 days.

(21) Appl. No.: 12/405,316

(22) Filed: Mar. 17, 2009

(65) Prior Publication Data
US 2010/0238196 A1 Sep. 23, 2010

(51) Int. Cl.
*G09G 5/00* (2006.01)
*G06F 1/16* (2006.01)
(52) U.S. Cl. .............. 345/659; 345/649; 361/679.26
(58) Field of Classification Search .......... 345/650, 345/156, 649, 657–659, 654; 715/864, 866; 455/556.2, 557; 361/679.03, 679.26
See application file for complete search history.

(56) References Cited

U.S. PATENT DOCUMENTS

| | | | |
|---|---|---|---|
| 5,030,944 A | 7/1991 | Masimo et al. | |
| 5,134,390 A | 7/1992 | Kishimoto et al. | |
| 5,189,404 A | 2/1993 | Masimo et al. | |
| 5,602,566 A | 2/1997 | Motosyuku et al. | |
| 5,661,632 A | 8/1997 | Register | |
| 5,798,750 A | 8/1998 | Ozaki et al. | |
| 5,920,688 A | 7/1999 | Cooper et al. | |
| 6,115,025 A | 9/2000 | Buxton et al. | |
| 6,137,468 A | 10/2000 | Martinez et al. | |
| 6,567,101 B1 | 5/2003 | Thomas | |
| 6,624,824 B1 | 9/2003 | Tognazzini et al. | |
| 6,704,007 B1 | 3/2004 | Clapper | |
| 6,798,429 B2 | 9/2004 | Bradski | |
| 6,982,728 B1 | 1/2006 | Nicolas et al. | |
| 7,030,868 B2 | 4/2006 | Clapper | |
| 7,259,772 B2 | 8/2007 | Koh et al. | |
| 7,271,795 B2 | 9/2007 | Bradski | |
| 7,289,102 B2 | 10/2007 | Hinckley et al. | |
| 2002/0140675 A1 | 10/2002 | Ali et al. | |
| 2003/0085870 A1* | 5/2003 | Hinckley | 345/156 |
| 2004/0201595 A1 | 10/2004 | Manchester | |
| 2005/0143124 A1* | 6/2005 | Kennedy et al. | 455/556.1 |

(Continued)

FOREIGN PATENT DOCUMENTS
GB 2326051 A 12/1998
WO WO-2008033795 A1 3/2008

OTHER PUBLICATIONS

International Search Report mailed Dec. 13, 2010, Application No. PCT/US2010/027491, in the name of Harris Corporation.

*Primary Examiner* — Chante Harrison
(74) *Attorney, Agent, or Firm* — Fox Rothschild, LLP; Robert J. Sacco

(57) ABSTRACT

A portable electronic device is provided. The electronic device includes a device body having at least one accessory interface and at least one display device positioned on a surface of the device body. The electronic device also includes a display driver device communicatively coupled to the display device and configured for receiving data for presentation on the display device and generating signals for causing the data to be presented on the display device. In the electronic device, the display driver device selects one orientation from a plurality of pre-defined orientations for the data on the display device based at least on a current orientation of the device body and a status of the accessory interface.

23 Claims, 9 Drawing Sheets

U.S. PATENT DOCUMENTS

| | | |
|---|---|---|
| 2008/0048933 A1 | 2/2008 | Liou et al. |
| 2008/0284738 A1 | 11/2008 | Hovden et al. |
| 2008/0303681 A1* | 12/2008 | Herz et al. .................... 340/671 |
| 2009/0003620 A1* | 1/2009 | McKillop et al. ............... 381/80 |
| 2010/0088532 A1* | 4/2010 | Pollock et al. ................. 345/650 |
| 2010/0177476 A1* | 7/2010 | Hotelling et al. ........ 361/679.41 |

* cited by examiner

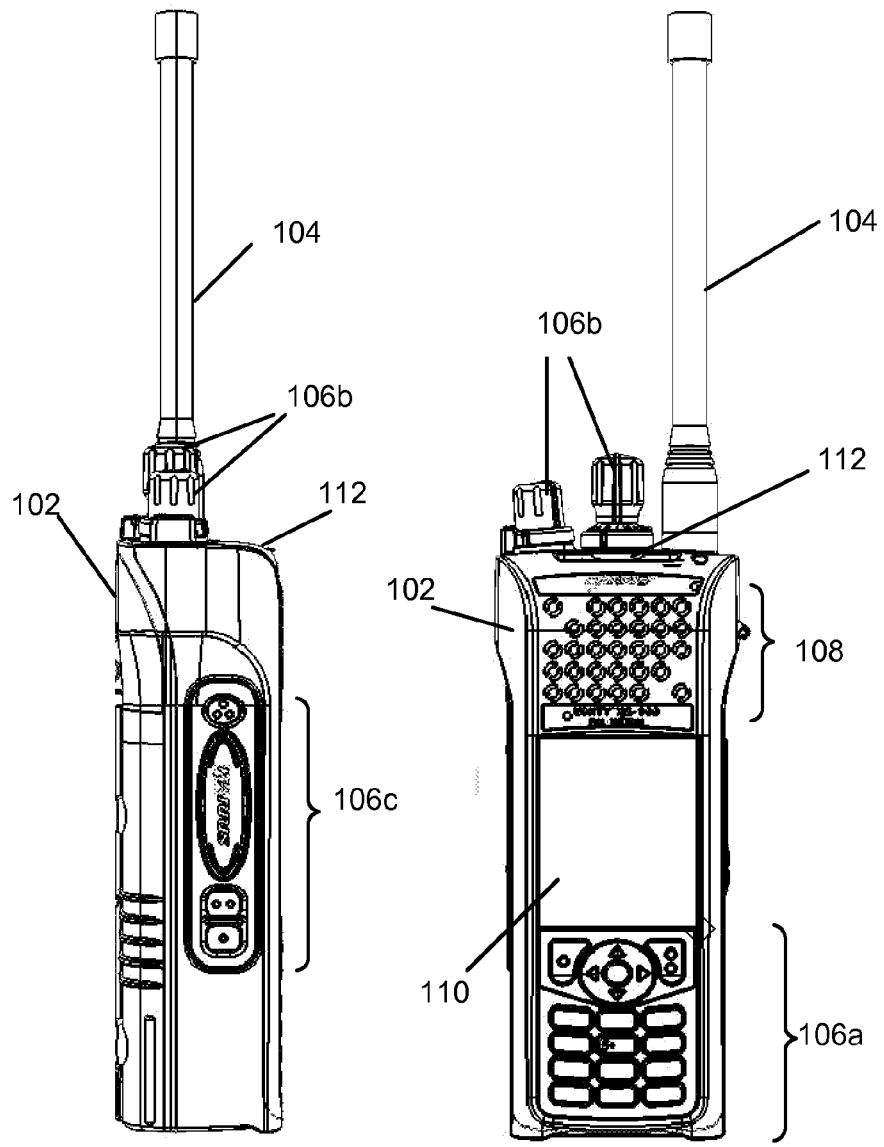
FIG. 1A
100
FIG. 1B
100
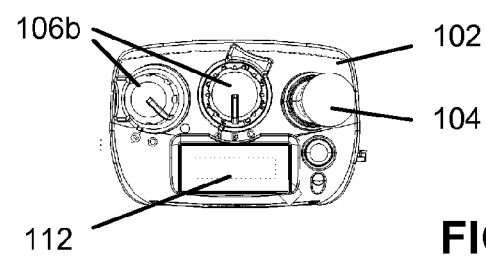
FIG. 1C
100

100

100

800

PORTABLE ELECTRONIC DEVICES WITH ADJUSTABLE DISPLAY ORIENTATION

FIELD OF THE INVENTION

The present invention relates to portable electronic devices with displays, and more specifically to portable electronic devices with adjustable display orientation.

BACKGROUND

Law enforcement officers, first responders, and other public safety officials typically utilize portable communications devices, such as portable Land Mobile Radios (LMRs). In general, not only are various types of such portable devices available, but these devices are carried and utilized by persons in many configurations and with or without one or more accessories. Accessories typically include charging devices, speaker/microphone devices, networking devices, or programming/configuration devices.

Some types of portable LMRs are provided with no means for displaying information to a user. Therefore, critical information can only be provided to the user by voice communications. In other types of portable LMRs, a limited front side display screen may be provided. Although such a configuration can be used to provide the user with information, the ability of the user to view such information may be limited. For example, if the portable LMR is currently attached to the user's body, the front display screen may not be viewable until the user removes the portable LMR from its attached location and faces the front side of the device. As a result, if the user's hands are currently occupied with other tasks, removal of the device to view the information may not be practical.

In some portable LMR devices, a top-side display has been provided to display critical information. In general such displays are designed based on the assumption that the user attaches the portable LMR to his body via a holster or belt clip. Accordingly, the top-side display is generally provided to include a fixed orientation to allow the user to simply look down at the top portion of the device to view the information.

SUMMARY

Embodiments of the present invention systems and methods in portable electronic devices. In a first embodiment of the invention, a portable electronic device is provided. The electronic device includes a device body having at least one accessory interface and at least one display device positioned on an exterior of the device body. The electronic device also includes a display driver device communicatively coupled to the display device and configured for receiving data for presentation on the display device and generating signals for causing the data to be presented on the display device. In the electronic device, the display driver device selects one orientation from a plurality of pre-defined orientations for the data on the display device based at least on a current orientation of the device body and a status of the accessory interface.

In a second embodiment of the invention, a method for operating an portable electronic device is provided. The electronic device includes a device body having at least one accessory interface, a display device positioned on an exterior of the device body, and a display driver device communicatively coupled to the display device. The display driver device is configured for receiving data for presentation on the display device and generating signals for causing the data to be presented on the second display. The method includes the steps of ascertaining a current orientation of the device body, determining a status of the accessory interface, and selecting one orientation from a plurality of pre-defined orientations for the data on the display device based on a current orientation of the device body and a status of the accessory interface.

In a third embodiment of the invention, a portable communications device is provided. The communications device includes a device body having at least one accessory interface, a first display device positioned on a first surface of the device body, and a second display device positioned on a second surface of the device body, where the first and the second surfaces are adjacent. The communications device also includes a display driver device communicatively coupled to the second display device and configured for receiving data for presentation on the second display and generating signals for causing the data to be presented on the second display. The communications device further includes at least one electrical load device communicatively coupled to the display driver device and the accessory interface, where the electrical load device is configured for generating a status of the accessory interface. The communications device also includes at least one accelerometer device disposed within the device body and communicatively coupled to the display driver and configured for providing at least one signal indicative of an current orientation of the device body. In the communications device, the display driver device selects one orientation from a plurality of pre-defined orientations for the data on the second display device based at least on a current orientation of the device body and a status of the accessory interface.

BRIEF DESCRIPTION OF THE DRAWINGS

FIG. 1A is a left side view of a portable communications device configured according to one embodiment of the invention.

FIG. 1B is a front view of a portable communications device in FIG. 1A.

FIG. 1C is a top view of a portable communications device in FIG. 1A.

DETAILED DESCRIPTION

Figures 1D, 1E:
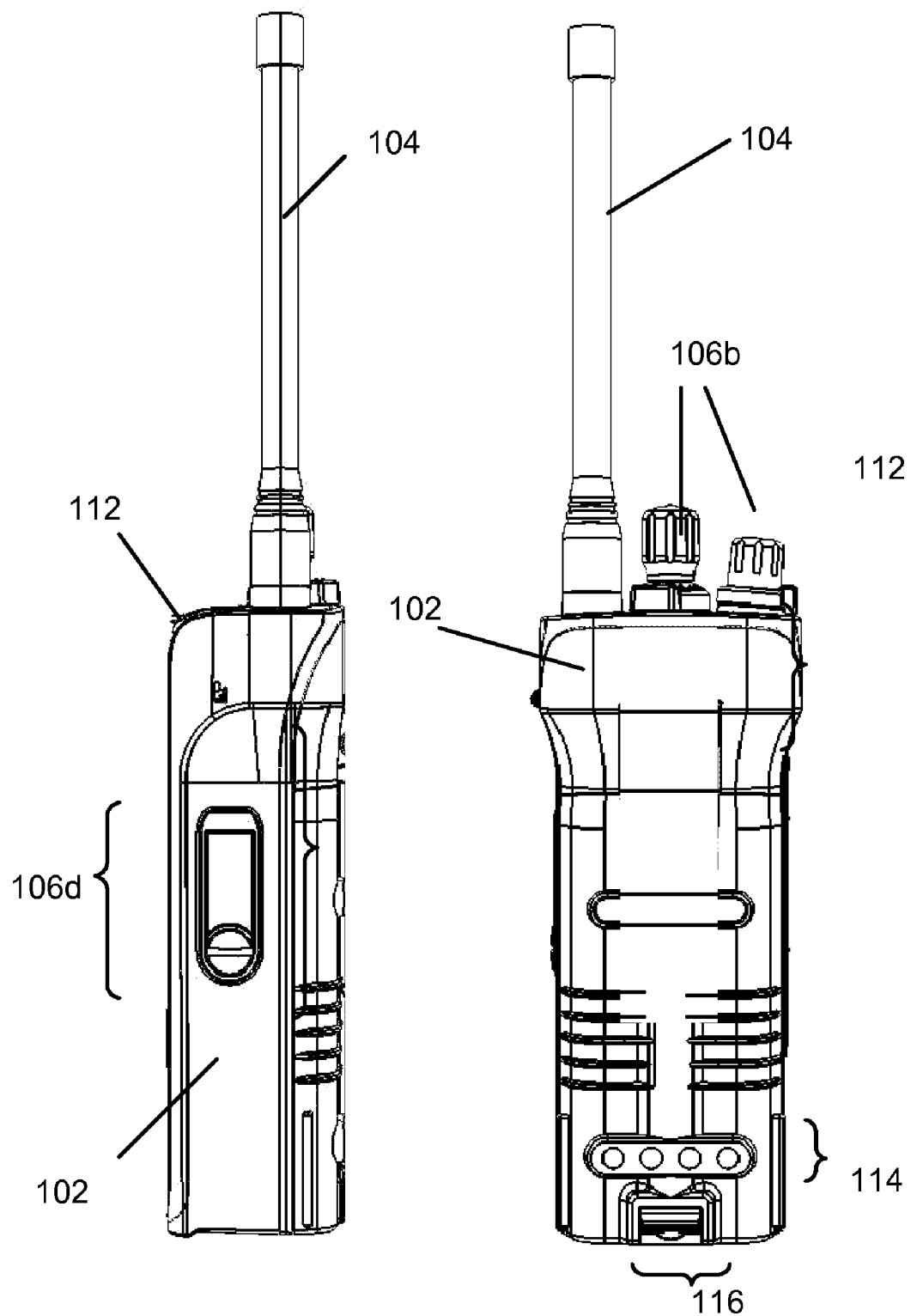
FIG. 1D is a right side view of a portable communications device in FIG. 1A.
FIG. 1E is a rear side view of a portable communications device in FIG. 1A.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, conventional portable electronic devices with multiple displays are typically designed to provide a fixed orientation for the information in each of the multiple displays. Such designs are generally configured with a particular type of use in mind, specifically an expected position of the device during operation. However, in practice such devices generally need to be used in other positions other than those the device was originally designed for. Accordingly, when the user sets down the device or attaches it to his body in a configuration other than the device was designed for, the information in one or more displays may be difficult to read and the user may be required to pick up the device in order to correctly view the information. As previously described, this can be a difficult task if the user's hands are otherwise occupied.

To overcome the limitations of such conventional portable electronics devices, embodiments of the invention provide systems and methods for operating portable electronic devices with one or more adjustable orientation displays. In particular, embodiments of the invention provide for adjusting the orientation of information in a display based at least one of an orientation of the portable electronic device and one or more accessories coupled to the portable electronic device. That is, the orientation of the device and the accessories connected thereto are utilized to determine how one or more displays on the device should be configured. In some embodiments, the orientation can also be adjusted manually by the user via one or more interface controls. A device capable of providing such adjustable displays is shown in FIGS. 1A-1E.

FIGS. 1A-1E show different views of a portable electronic device, particularly a portable communications device 100, configured in accordance with an embodiment of the invention. FIG. 1A shows a left side view. FIG. 1B shows a front side view. FIG. 1C is a top side view. FIG. 1D shows a right side view. FIG. 1E shows a rear side view. Device 100 can include a device enclosure or body 102 for enclosing various operational components (not shown) of the device 100. These can include wire line and/or wireless RF transceiver circuitry elements, as well as processing elements and/or memory elements for performing any specialized features. Device 100 can further include external antenna element 104 coupled to such components in body 102. However, embodiments of the invention are not limited to a single external antenna as shown in FIGS. 1A-1D, and device 100 can also include a plurality of antennas, including both external and/or internal antennas.

Device 100 can also include one or more user control features 106a, 106b, 106c, and 106d (collectively "106"). The user control features 106 can include keypads, buttons, sliders, and/or knobs for adjusting operation of the device 100. For example, control features 106b, shown as knobs in FIGS. 1A-1D, can be used to adjust a channel, a squelch setting, a volume, or any other setting of the device 100. Similarly, user control features 106a, 106b, configured as buttons, and user control feature 106d, configured as a slider, can also be used to adjust operation of device 100.

Device 100 can further include speaker/microphone grill 108 for providing access to a speaker (not shown) and a microphone (not shown) within body 102 for receiving and producing sound for device 100 during its operation. The term "grill" as used herein refers to one or more openings in body 102. Although grill 108 is shown as being located in a particular location on device 100 (the top of the front side), embodiments of the invention are not limited in this regard. In other embodiments, grill 108 can be located on different surfaces of the body 102. For example, if a microphone of device 100 is located on the front side and the speaker is located on the rear side, a grill can be provided on each side for providing access to the speaker and microphone. Additionally, device 100 can be configured to include multiple speakers and/or multiple microphones, and multiple grills can therefore be provided accordingly.

In FIGS. 1A-1D, first 110 and second 112 displays are provided on body 102. As shown in FIGS. 1A-1D, displays 110 and 112 can be provided on adjacent surfaces of body to allow display of information in various orientations and viewing positions of device 100. In general, opposite surfaces can provide at least two orientations for viewing the information on the displays thereon. However, because this effectively results in a symmetric arrangement, the number and type of viewing positions is effectively the same for both displays. In contrast, using an asymmetric arrangement, such as in FIGS. 1A-1D, not only provides at least two orientations for viewing the information, but also allows two different types of viewing positions to be used as well. For example, the configuration in FIGS. 1A-1D is advantageous as it allows second display 112 to be viewed when device 100 is placed in a holster, a charger, or other device that maintains device 100 in a generally vertical position, while allowing display 110 to be viewed when a user is holding device 100. Although FIGS. 1A-1D only shows two displays, the embodiments of the invention are not limited in this regard. In other embodiments of the invention, a portable electronics device can include any number of displays, including displays on both opposite and adjacent surfaces of a device with respect to a first display.

As shown in FIGS. 1A-1D, device 100 can further include one or more electrical interface features 114 and mechanical interface features 116. Electrical interface features 114 can be electrical contacts used for providing a charging current to a battery or power supply (not shown) within body 102. Additionally, electrical interface features 114 can also be used to exchange one or more signals or data with an external device or accessory (not shown). Mechanical interface features 116 can be features for mechanically coupling body 102 to an accessory (not shown). In some embodiments, mechanical interface features 116 can be connected to an electrical switch or other mechanically operated electrical device for generating signals to device 100 indicative of an accessory being coupled to device 100. An exemplary use of these electrical and mechanical interface features 114, 116 will be described below in greater detail with respect to FIGS. 5 and 6.

As described above, a portable electronics device in accordance with an embodiment of the invention can include one or more operational components. In the various embodiments of the invention, these can include operation components for adjusting the orientation of a display in the portable electronic devices. An exemplary arrangement of such components is shown below in FIG. 2.

Figure 2:
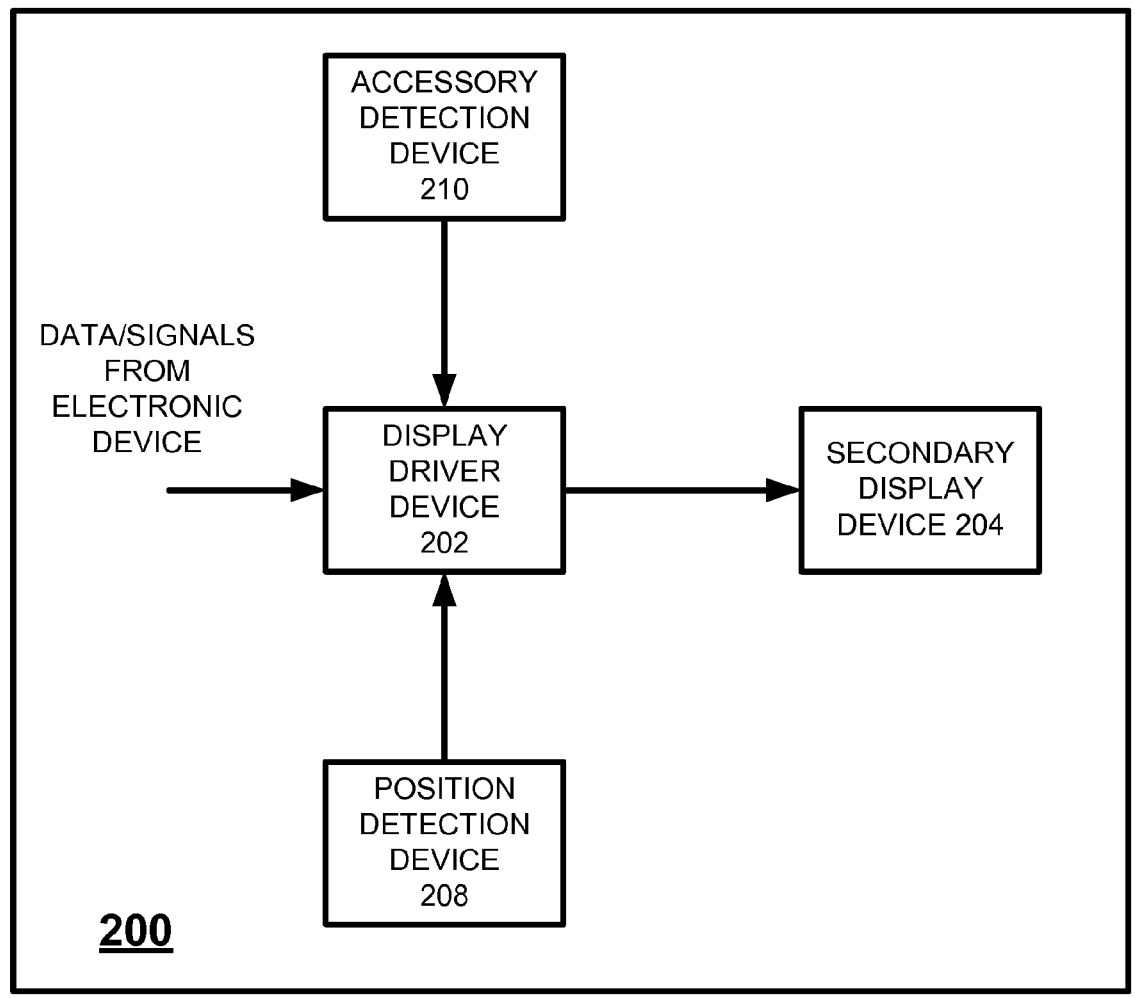
FIG. 2 is a block diagram of a portable electronic device with an adjustable display in accordance with an embodiment of the invention.

FIG. 2 is a block diagram of a portable electronic device 200 with an adjustable display in accordance with an embodiment of the invention. As shown in FIG. 2, device 200 can include display driver device 202 communicatively coupled to display device 204. In operation, display driver device 202 receives signals or data representing the information to be displayed and generates an appropriate set of signals 206 to cause display device 204 to present the information to the user. In the various embodiments of the invention, as shown in FIG. 2, display driver device 202 is also configured to receive data from two additional sources, position detection device 208 and accessory detection device 210. These devices can be implemented in a centralized or distributed fashion within device 200. For example, the devices can be formed using a one or more common integrated circuits or other common electrical circuit features or devices.

Position detection device 208 is configured to provide data to display driver device 202 representing the current orientation and/or tilt of device 200. For example, detection device can comprise accelerometer devices, gyroscopic devices, or any combination thereof. In the various embodiments of the invention using accelerometer devices, single- and multi-axis accelerometers can be used to detect the magnitude and direction of the acceleration of the device 200 as a vector quantity, and can be used to sense orientation of device 200. In some embodiments, position detection device 208 can provide data indicating the actual orientation of device 200. That is, detection device 208 can include processing elements for determining whether device 200 is positioned in a horizontal position, a vertical position, or a tilted position and for transmitting such information to display driver device. In other embodiments, detection device 208 can provide raw sensor data (i.e., raw data from the accelerometers or vector data) and display driver device 202 can be configured to determine the orientation of device 200. Although FIG. 2 shows a single position detection device, the embodiments of the invention are not limited in this regard. Rather, any number of position detection devices, operating separately or in concert, can be used to generate data indicative of the orientation of device 200.

Accessory detection device 210 is configured to provide data to display driver device 202 representing whether device 200 is currently coupled to an external accessory. For example, in one embodiment, detection device 210 at least one electrical load device configured to respond to the presence of an accessory. In such embodiments, an electrical parameter, such as voltage, current, and/or resistance, of the load device can be monitored. Particular values of these electrical parameters can be assumed to be associated with the presence of a particular type of accessory. Accordingly, if the values for the electrical parameter being monitored fall within a particular range, detection device 210 can generate a signal indicating the presence of a particular accessory. In some embodiments, detection device 210 can be based on a mechanical interface feature, as described above with respect to FIGS. 1A-1D. In such embodiments, activation of the mechanical feature can be assumed to be associated with coupling of a particular accessory. Accordingly, such an activation can trigger generation of a signal indicating the presence of a particular accessory. For example, the mechanical interface feature can be used to alter the state of a switch or other electronic device for generating a signal. In some embodiments, the signals from detection device 210 can provide data indicating the particular accessory being coupled to device 200. In other embodiments, detection device 210 can provide raw data and display driver device 202 can be configured to determine the accessory coupled to device 200. Although FIG. 2 shows a single accessory detection device, the embodiments of the invention are not limited in this regard. Rather, any number of accessory detection devices, operating separately or in concert, can also be used to provide data indicative of the accessories currently coupled to device 200. Alternatively, signals indicative of an accessory being coupled to device 200 can be provided along with the data representing the information to be displayed. For example, in the case of wireless accessories, a processing element can generate signals indicative of such accessories.

As described above, one aspect of the present invention is to provide portable electronic devices in which the orientation of information on a display is adjusted based on the orientation of the device. Such a feature can be advantageous in many emergency situations. For example, if a first responder sets down a communications device with a display facing him, but without considering its position or orientation, a conventional device configuration may result in a display in which the information is inverted, decreasing readability. In contrast, a device configured in accordance with an embodiment of the invention can automatically adjust the information on the display, in response to the orientation of the device, to allow the responder to view the information easily. As a result, the responder will not be forced to re-position the device in order to view incoming information, allowing him to concentrate more fully on the emergency situation. This is illustrated in FIGS. 3A-3D.

FIGS. 3A-3D illustrate exemplary operation of second display 112 of portable communications device 100 shown in FIGS. 1A-1D responsive to the orientation of body 102. In general, when device 100 is set down on a surface, there are several possible orientations of body 102. FIGS. 3A-3D shows the operation of second display 112 to account for a few of these orientations. In particular, FIGS. 3A-3D are based on the rotation of the top view shown in FIG. 1C.

Figure 3A:
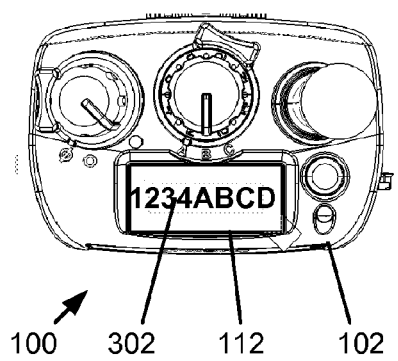
FIG. 3A-3D shows an exemplary operation of the adjustable display of the portable communications device shown in FIGS. 1A-1E responsive to the orientation of the portable communications device.
Figure 3C:
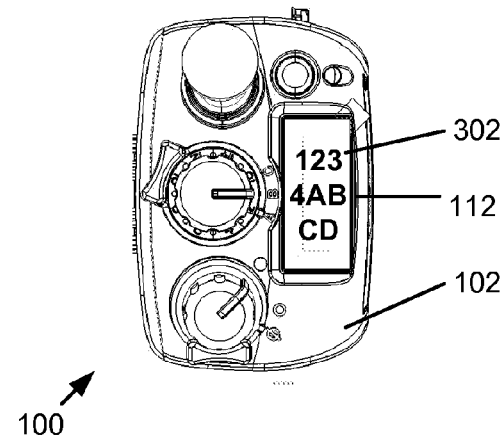
Figure 3B:
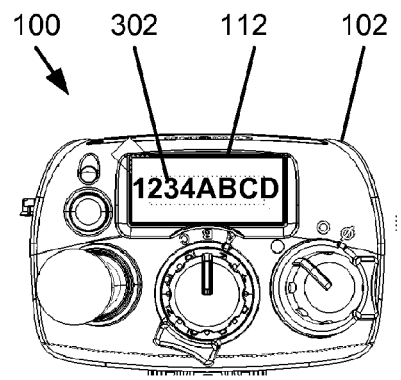

FIG. 3A shows a first orientation for body 102, in which first screen 110 in FIGS. 1A-1D is face down. In operation, the position detection devices described above can be used to determine that body 102 is in such a configuration and the display driver device can be used to provide a first set of signals to second display 112. This first set of signals can specify that information 302 is shown in display 112 so that a user can read the information without the need to rotate or adjust the position of body 102. FIG. 3B shows a second orientation for body 102, in which first screen 110 in FIGS. 1A-1D is face up. In operation, the position detection devices described above can be used to determine that body 102 is in such a configuration and the display driver device can be used to provide a second set of signals to second display 112. This second set of signals can specify that information 302 is shown in display 112 so that a user can read the information without the need to rotate or adjust the position of body 102. As a result, when body 102 is rotated between the positions shown in FIGS. 3A and 3B, information 302 can be switched between a first orientation and a second orientation, where the second orientation is inverted with respect to the first orientation. That is, information 302 in the second orientation shown in FIG. 3B is rotated approximately 180 degrees as compared to the orientation in FIG. 3A.

Figure 3D:
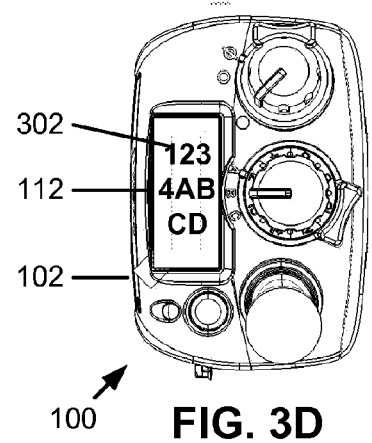

Although in one embodiment of the invention the adjustment of displays can be limited to only a few preferred orientations for the information being displayed, the various embodiments of the invention are not limited in this regard. In some embodiments of the invention, the orientation for the information displayed can be varied to account for any orientation of a portable electronics device. For example, device 100 can also have third and fourth orientations for information 302, as shown in FIGS. 3C and 3D, respectively, for other orientations of body 102. Additionally, depending on the configuration of display 112, a reformatting or reorganization of information 302 can be necessary, as shown in FIGS. 3C and 3D.

FIG. 3C shows a third orientation for body 102, in which first screen 110 in FIGS. 1A-1D is facing right. In operation, the position detection devices described above can be used to determine that body 102 is in such a configuration and the display driver device can be used to provide a third set of signals to second display 112. This third set of signals can specify that information 302 is shown in display 112 so that a user can read the information without the need to rotate or adjust the position of body 102. That is, information 302 is rotated approximately 90 degrees as compared to the orientation in FIG. 3A. FIG. 3D shows a fourth orientation for body 102, in which first screen 110 in FIGS. 1A-1D is facing left. In operation, the position detection devices described above can be used to determine that body 102 is in such a configuration and the display driver device can be used to provide a fourth set of signals to second display 112. This fourth set of signals can specify that information 302 is shown in display 112 so that a user can read the information without the need to rotate or adjust the position of body 102. That is, information 302 is rotated approximately 90 degrees and 180 degrees as compared to the orientations in FIGS. 3A and 3C, respectively.

In addition to adjustment of a display in response to a rotation of the portable electronics devices, as illustrated in FIGS. 3A-3D, some embodiments of the invention can also provide for adjustment of a display in response to tilt. For example, in FIGS. 3A-3D, device 100 is shown in various positions is placed upon a surface. However, in some cases a device may not be sitting on a surface as in FIGS. 3A-3D when read. Rather, a user may grab the device and turn or tilt the display sufficiently to view the display. Accordingly, in some embodiments of the invention, the position detecting devices can be used to detect or determine the tilt angle of the portable electronics device and adjust the orientation of the display accordingly. That is, the display can be adjusted to an orientation that can easily be read by a user viewing the display at the current tilt angle. This concept is illustrated in FIG. 4

Figure 4:
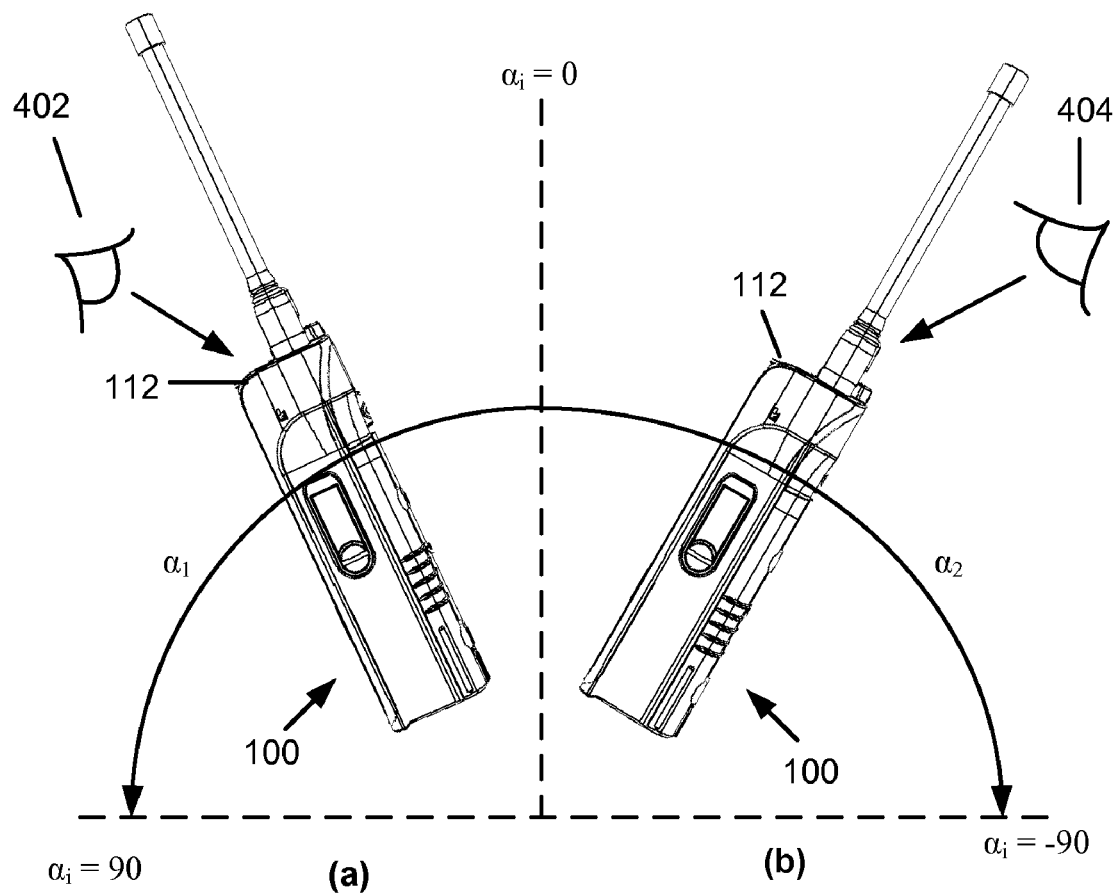
FIG. 4 shows an exemplary operation of the adjustable display of the portable communications device shown in FIGS. 1A-1E responsive to tilt of the portable communications device.

FIG. 4 illustrates operation of the adjustable display of the portable communications device shown in FIGS. 1A-1E in response to tilting of the portable communications device. In particular, FIG. 4 shows how a display would be adjusted as a portable communications device is tilted through a variety of tilt angles $\alpha_t$. For purposes of illustration, FIG. 4 illustrates two scenarios: (a) when a user 402 is facing the front of device 100 and (b) when a user 404 is facing the back of device 100. In scenario (a), when user 402 is facing the front of device 100, user 402 is likely to tilt device 102 forward at an angle $\alpha_1$ with respect to a vertical orientation of device 100 (i.e., $0 < \alpha_t < 90$ degrees) to view display 112. Accordingly, the display driver device can be configured to assume such a viewing position when device 100 is tilted forward and the orientation for display 112 can be configured to present information accordingly. In particular, the information can be oriented as in FIG. 3A. In scenario (b), when user 404 is facing the back of device 100, user 404 is likely to tilt device 102 backwards at an angle $\alpha_2$ with respect to a vertical orientation of device 100 (i.e., $0 > \alpha_t > -90$ degrees) to view display 112. Accordingly, the display driver device can be configured to assume such a viewing position when device 100 is tilted backwards and the orientation for display 112 can be configured to present information accordingly. In particular, the information can be oriented as in FIG. 3B.

In some embodiments, the final orientation of information on a display can be based on tilt and/or orientation of the portable electronics device. That is, for a particular set of orientation and tilt, a particular display orientation can be selected by the display driver. Such a configuration potentially allows the display to present easily read information regardless of the position of the portable electronics device. However, in some instances, basing the orientation of a display solely on the orientation of a device is undesirable. For example, if a device is attached to a user's waist, it is generally undesirable for the display orientation to be varied as the position of the device changes. That is, even though the position and orientation of the device may vary, the relative positions of the user viewing the device display and the device remain effectively unchanged. Rather, it is desirable that the display remain oriented such that the user can view the display in the same way in either case, even though the position of the device may be significantly different. Therefore, in some embodiments of the invention, a user can provide control signals for fixing the orientation of a device. For example, a knob, switch, or setting of the portable electronics device can be set such that the orientation remains unchanged regardless of the signals generated by one or more position detection devices. In particular, a signal can be provided to the display device to override the orientation based on the position of device with an orientation associated with the user control signal.

However, although a setting can be used to permanently fix an orientation of a display, having to adjust such a setting each time the portable electronics device coupled to a different type of accessory can be cumbersome. In general, when a portable electronics device is coupled to some types of accessories, there is a preferred orientation for the display. Therefore, an additional aspect of the present invention is to fix the orientation of a display based on an accessory coupled to the portable electronics device. In particular, since a preferred orientation is already known, upon receiving a signal from an accessory detecting device, as described above with respect to FIG. 2, the display driver device can select a pre-defined orientation associated with the accessory detected. Such a configuration can eliminate the need for a user to reset a display orientation after connecting an accessory.

Figure 5:
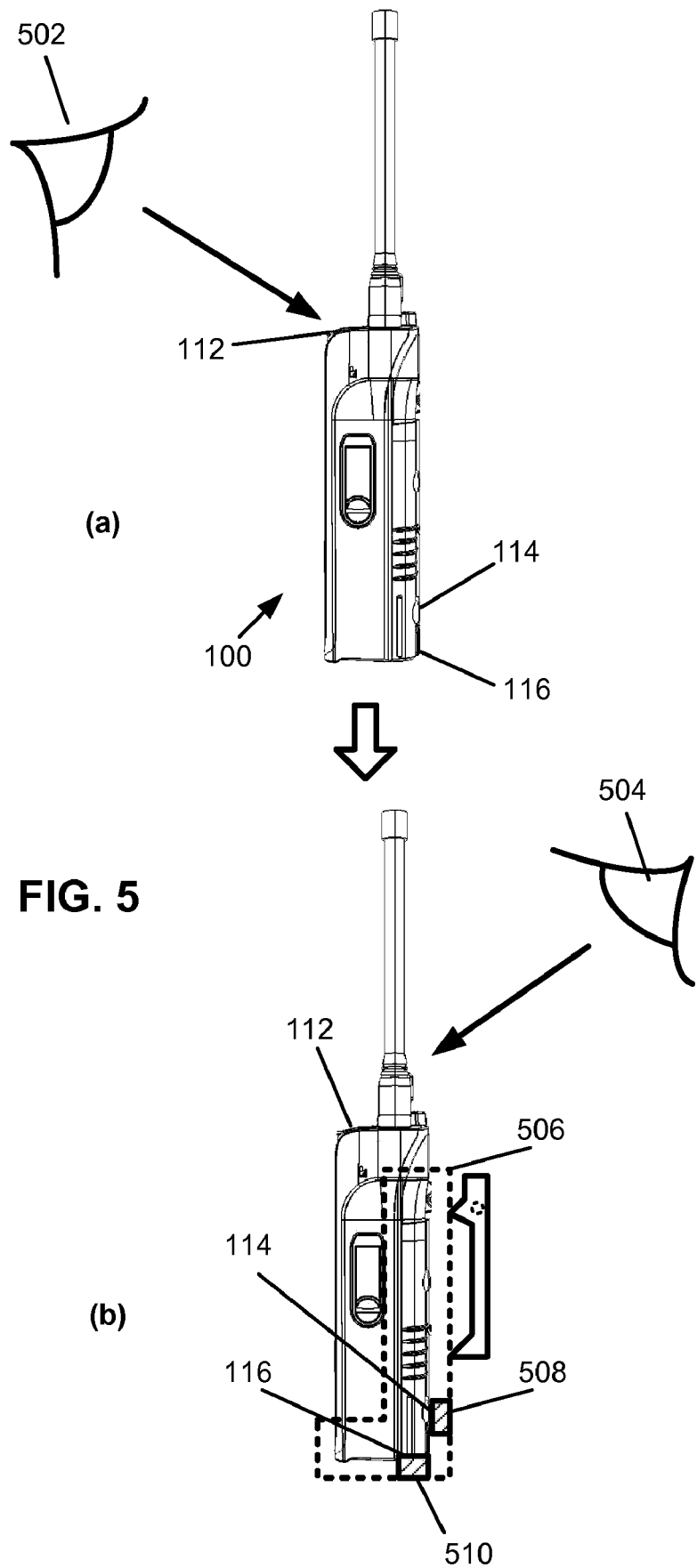
FIG. 5 shows an exemplary operation of the adjustable display of the portable communications device shown in FIGS. 1A-1E responsive to insertion of the portable communications device into a holster.

For example, FIG. 5 illustrates operation of the adjustable display of the portable communications device shown in FIGS. 1A-1E responsive to insertion of the portable communications device into a holster or other device retaining feature. For purposes of illustration, FIG. 5 illustrates two scenarios: (a) when a user 502 is holding or facing device 100 and (b) when a user 504 is viewing device 100 placed in holster 506 at a waist of user 504. In scenario (a), when user 502 is holding device 100, he is likely facing the front of device 100 to view display 112. Accordingly, the display driver device can be configured to assume such a viewing position when device 100 is not in holster 506. As a result, the pre-defined orientation for display 112 in scenario (a) can present information oriented for such a viewing position. In particular, the information can be oriented as in FIG. 3A so that the information does not appear inverted to user 502. In scenario (b), when user 504 viewing device 100 in holster 506 at his waist, user 504 is likely to be facing the back of device 100. As a result, the pre-defined orientation for display 112 can present information oriented for such a viewing position. In particular, the information can be oriented as in FIG. 3B.

In scenario (b) of FIG. 5, the presence of holster 506 can be detected in several ways. For example, holster 506 can include electrical features 508 for interacting with electrical interface features 114. For example, electrical features 508 can complete a circuit between two or more of interface features 114. Alternatively, electrical feature 508 can be one or more magnetic features for causing a mechanical switch (not shown) within device 100 to operate or for causing a electrical parameter variation in an electrical load feature (not shown) within device 100. These exemplary embodiments are shown by way of example and not limitation. In the various embodiments of the invention, device 100 and holster 506 can be designed to provide any type of electrical and/or magnetic interaction to generate a signal within device 100 to indicate the presence of holster 506 or any other accessory. Furthermore, such interactions can be designed such that they are unique to the particular accessory being coupled to the portable electronics device or are associated with a particular display orientation.

Alternatively or in addition to electrical features 508, holster 506 can also include mechanical features 510 for interacting with mechanical interface features 116 in device 100. In particular, mechanical features 510 can include structures from causing the mechanical interface features to operate. For example, mechanical features 510 can be one or more protrusions designed to engage with a switch provided as mechanical interface feature 116 in device 100. These exemplary embodiments are shown by way of example and not limitation. In the various embodiments of the invention, device 100 and holster 506 can be designed to provide any type of mechanical interaction. Furthermore, the interaction can be designed such that it is unique to the particular accessory being coupled to the portable electronics device.

As described above, the interaction provided between the interface features of a portable electronics device and corresponding features on an accessory can be used to uniquely define the accessory, or at least uniquely define a group of accessories associated with a particular display orientation. For example, as described above, insertion of a portable electronics device in a holster defines a particular orientation for a display. However, insertion of the portable electronics device into other types of accessories can require a different orientation. This is conceptually illustrated in FIG. 6.

Figure 6:
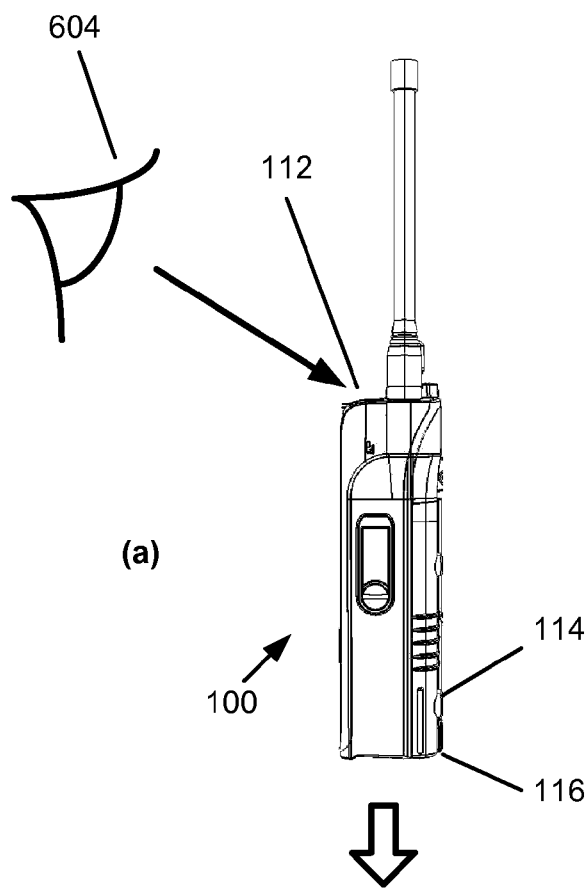
FIG. 6 shows an exemplary operation of the adjustable display of the portable communications device shown in FIGS. 1A-1E responsive to insertion of the portable communications device into a charging or programming station.
Figure 6:
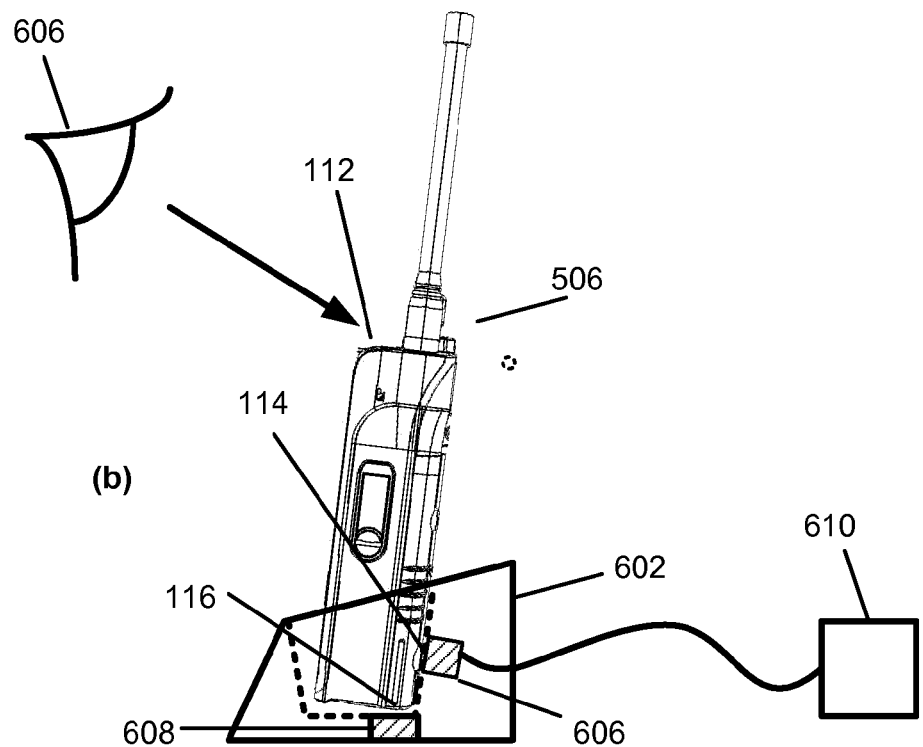

FIG. 6 illustrates operation of the adjustable display of the portable communications device shown in FIGS. 1A-1E responsive to use of the portable communications device with charging or programming station 602. For purposes of illustration, FIG. 5 illustrates two scenarios: (a) device 100 prior to insertion into station 602 and (b) device 100 after insertion into station 602. In scenario (a), when user 604 is viewing device 100 prior to insertion, he is likely holding the device and facing the front of device 100 to view display 112. Accordingly, the display driver device can be configured to assume such a viewing position when device 100 is not in station 602. As a result, the orientation for display 112 can be configured to present information oriented for such a viewing position. In particular, the information can be oriented as in FIG. 3A. In scenario (b), when device 100 is inserted into station 602, user 606 is still likely to facing the front of device 100, in contrast to scenario (b) of FIG. 5. As a result, the orientation for display 112 can be configured so as not to change orientation as compared to scenario (a). However, the various embodiment of the invention are not limited in this regard. For example, user 606 could be facing the rear of device 100 as well for a particular type of station 602. In such embodiments, a change in orientation can be provided.

In scenario (b) of FIG. 6, the presence of station 602 can be detected in several ways. For example, as described above for holster 506, station 602 can also include electrical features 606 for interacting with electrical interface features 114 of device 100, as described above with respect to features 508 in FIG. 5. Additionally, in the case of a programming station, the presence of station 602 can be detected if the electrical features 606 are providing data to device 100 from an external system 610 coupled to station 602. Station 602 can also include mechanical features 608 for interacting with mechanical interface features 116 of device 100 as described above with respect to features 510 in FIG. 5.

In FIGS. 5 and 6, the orientation of a display is selected primarily based on an interaction including physical contact or a close proximity (as discussed above in the case of a magnetically actuated switch) between the portable electronics device and the accessory. However, with the availability of wireless connectivity features, such as Bluetooth enabled accessories or wireless accessories operating using any of the 802.xx family of wireless communications standards, there can be circumstances in which the accessory is not contacting the portable electronics device and is relatively remotely located. For example, a speaker/microphone headset can be wirelessly coupled to a portable communications device, such as an LMR. In such an arrangement, the LMR and the headset may be separated by as much as a few feet, preventing any significant contact or proximity based interact. Nonetheless, a pre-determined orientation can also be provided in such situation. This is conceptually illustrated in FIG. 7.

Figure 7:
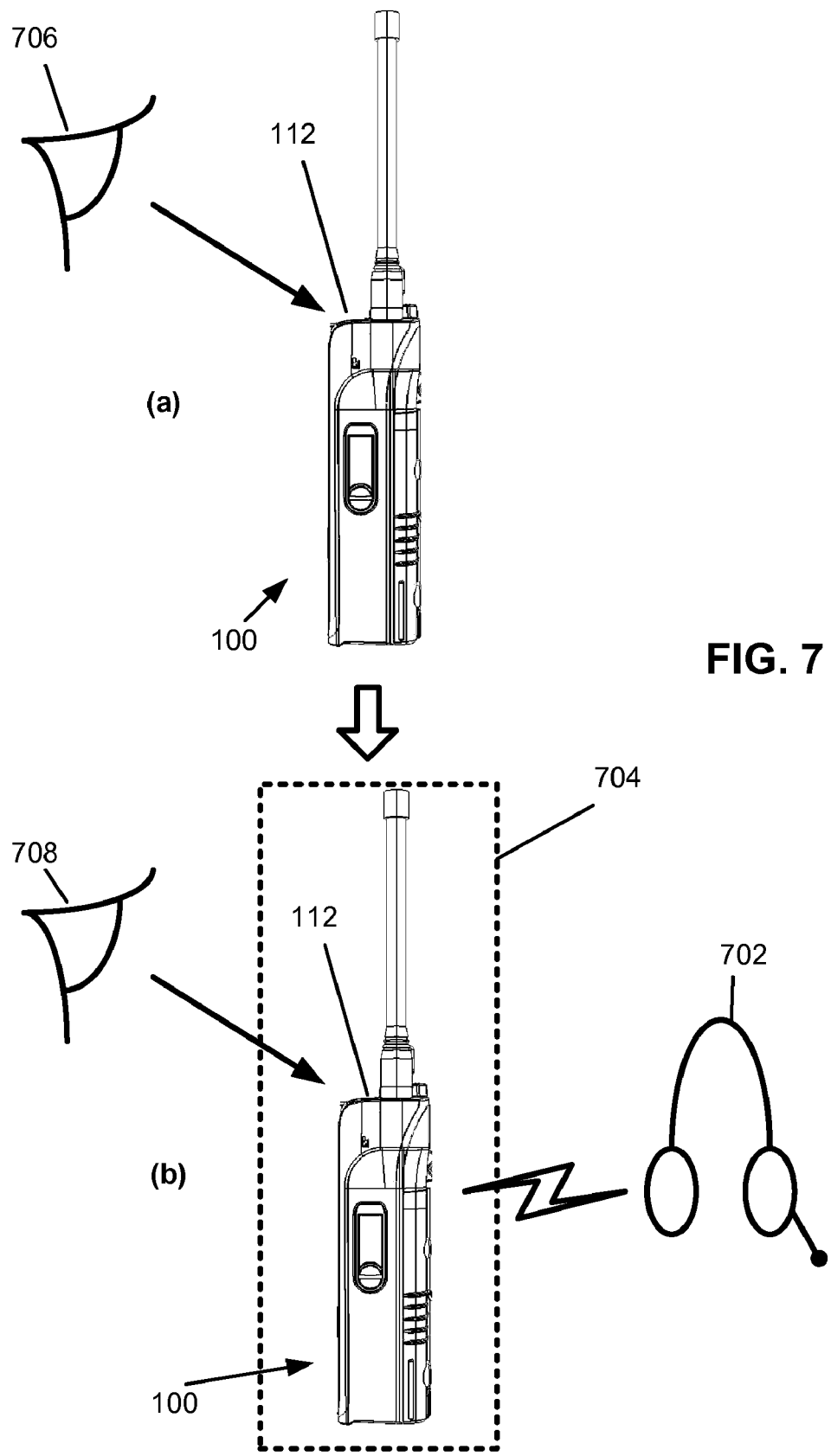
FIG. 7 shows an exemplary operation of the adjustable display of the portable communications device shown in FIGS. 1A-1E responsive to use of the portable communications device with a wireless speaker/microphone headset.

FIG. 7 illustrates operation of the adjustable display of the portable communications device shown in FIGS. 1A-1E responsive to use of the portable communications device with a speaker/microphone headset. For purposes of illustration, FIG. 5 illustrates two scenarios: (a) device 100 prior wirelessly coupling to a speaker/microphone headset 702 and (b) device 100 after coupling with headset 702 and insertion into a retaining structure 704. In such embodiments, a processing element in device 100 can generate signals indicating that headset 702 or any other accessory has been wirelessly coupled to device 100. In scenario (a), when user 706 is viewing device 100 prior to coupling to headset 702 and insertion into retaining structure 704, he is likely holding the device and facing the front of device 100 to view display 112. Accordingly, the display driver device can be configured to assume such a viewing position when device 100 is not in station 602 and display 112 can be configured to present information oriented for such a viewing position. In particular, the information can be oriented as in FIG. 3A. In scenario (b), when device 100 is coupled to headset 702 and inserted into retaining structure 704, how the user 708 views device 100 can vary.

As described above, a display driver in accordance with an embodiment of the invention can select a pre-determined orientation based on orientation and the accessories coupled to the device. However, in some cases, the type of retaining structure being used may not be configured to interact with device 100. For example, in the case firefighting personnel, a LMR used with a wireless headset is typically inserted into an interior coat pocket (in order to protect the LMR) and facing the firefighter. To view the information on the display, firefighting personnel typically open the coat slightly to view the information. However, this coat pocket may not include any features for signaling its orientation or position. Rather, in such embodiments, device 100 can rely on the presence of the wireless headset 702. That is, the device 100 is inserted into retaining structure 704 and wireless coupled to headset 702, the display driver assumes that device 100 is facing the user. As a result, the orientation for display 112 can be configured so as not to change orientation as compared to scenario (a).

Although the exemplary embodiments of the invention described above show particular display orientations for particular accessories and particular orientations of the portable electronics device, the various embodiments of the invention are not limited to these display orientations. Rather, the display device driver can be configured to associate any display orientation with any combination of signals for position detection devices, accessory detection devices, or any combination thereof. For example, a portable electronics device can include configuration mode for a user to specify the various pre-defined orientations used therein.

Figure 8:
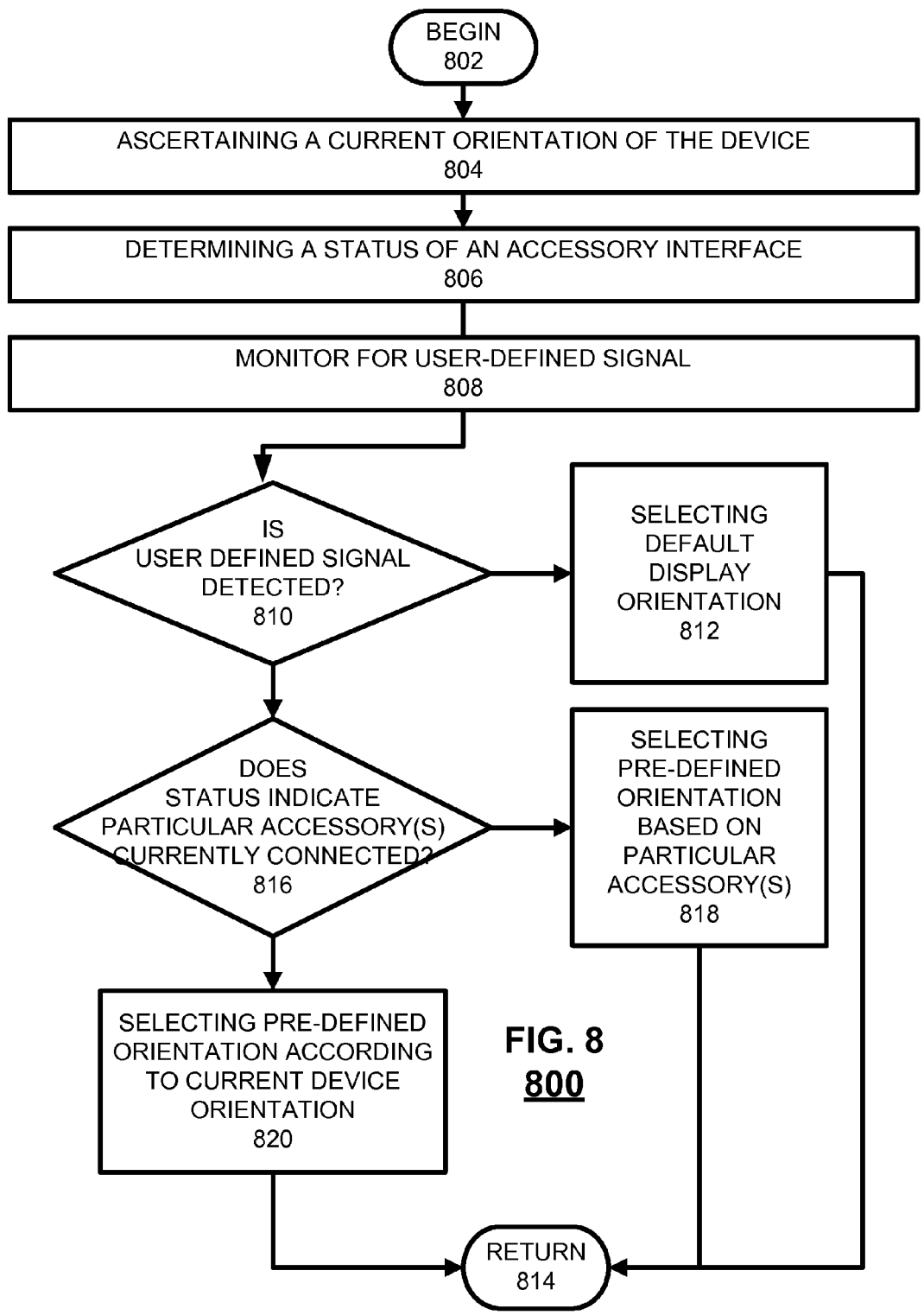
FIG. 8 is a flowchart of steps in an exemplary method for operating a portable communications device in accordance with an embodiment of the invention.

FIG. 8 is a flowchart of steps in an exemplary method for operating a portable electronics device with an adjustable display orientation in accordance with an embodiment of the invention. Method 800 begins at block 802 and continues on to block 804. At block 804, the current orientation of the device can be ascertained based on the signals generated by the position detection devices, as described above. Subsequently or in combination with block 804, method 800 can determine a status of one or more accessory interfaces at block 806. That is, method 800 can check whether the electrical or mechanical interface features, as described above with respect to FIGS. 1, 5, and 6, have been engaged to indicate interaction with a particular accessory. Alternatively, method 800 can check if a processing element is generating signals indicative of the presence of an accessory, such as a wireless accessory, as described above with respect to FIG. 7. Additionally, at block 808, method 800 can monitor for a user control signal, as described above, to manually fix the orientation of the display. For example, the status of a manual control knob, button, or setting can be monitored.

Method 800 can then proceed to block 810. At block 810, if a user control signal has been provided at block 808, the method proceeds to block 812. At block 812, the default orientation associated with the user control signal is selected to override any pre-defined orientation that the display driver device would have selected based on the device orientation and/or accessories coupled to the device. Method 800 can then end at step 814 and resume previous processing, including repeating method 800. If at block 810, it is determined that a user signal has not been provided, method 800 can proceed to block 816.

At block 816, if the status at block 806 indicates that a particular accessory has been coupled to the device, method 800 can proceed to block 818. At block 818, a display orientation associated with the particular accessory can be selected to set the display orientation. For example, if a holster is detected, a first pre-defined display orientation associated with a holster, such as that described in FIG. 5, can be selected. If a charging or programming station is detected, a second pre-defined display orientation associated with such a station, such as that described in FIG. 6, can be selected. In some embodiments, a selection can be based on the presence of two or more accessories (e.g., a headset and a holster) and the corresponding pre-defined orientation for the display is selected. Method 800 can then end at step 814 and resume previous processing, including repeating method 800.

At block 816, if it is determined that no accessories have been coupled to the device, method 800 can proceed to block 820. At block 820, the current orientation of the device can then be used to select the pre-defined display orientation. For example, the display orientation can be selected as described above with respect to FIGS. 3 and 4. Afterwards, method 800 can then end at step 814 and resume previous processing, including repeating method 800.

While various embodiments of the present invention have been described above with respect to a few exemplary embodiments, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A portable electronic device comprising:
   a device body having at least one accessory interface;
   at least a first display device on a first exterior surface of the device body;
   at least a second display device on a second exterior surface of the device body which is adjacent to said first exterior surface and is oriented transverse to said first exterior surface;
   a display driver device communicatively coupled to the second display device and configured for receiving data for presentation on said second display device and generating signals for causing the data to be presented on the second display device and
   at least a first accessory detection device comprising at least one accessory sensor, said first accessory detection device being communicatively coupled to said display driver device and said accessory interface;

at least a second accessory detection device communicatively coupled to said display driver device;
wherein said first accessory detection device is configured for generating a first presence signal exclusively indicating the presence or absence of a first particular accessory coupled to said accessory interface;
wherein said second accessory detection device is configured for generating a second presence signal indicating the presence or absence of a second particular accessory which is being used with said portable electronic device;
wherein said display driver device is configured to select one orientation from a plurality of pre-defined orientations for said data on said second display device based at least on a current orientation of said device body, said first presence signal, and said second presence signal.

2. The portable electronic device of claim 1, wherein responsive to said first presence signal, indicating the presence of said first particular accessory currently coupled to said accessory interface, and said second presence signal indicating the presence of said second particular accessory, said display driver is configured to select said one orientation associated with said first and second particular accessories.

3. The portable electronic device of claim 1, wherein responsive to said first presence signal indicating the presence of said first particular accessory currently coupled to said accessory device, and said second presence signal indicating the presence of said second particular accessory, said display driver device is configured to determine a type of said first and second particular accessory, and to select said one orientation associated with said accessory types.

4. The portable electronic device of claim 3, wherein said accessory sensor comprises at least one electrical load device associated with said currently coupled first particular accessory, said electrical load device and said first particular accessory configured to interact to cause at least one electrical parameter of said electrical load device to vary in response to said first particular accessory being coupled to said accessory interface.

5. The portable electronic device of claim 3, wherein said first accessory detection device comprises at least one switch associated with said currently coupled first particular accessory, said switch configured to change from a first state to a second state in response to said first particular accessory being coupled to said accessory interface.

6. The portable electronic device of claim 1, wherein responsive to said first presence signal indicating the absence of an accessory at said accessory interface, said display driver selects said one orientation associated with said current orientation of said device body.

7. The portable electronic device of claim 1, further comprising at least one position detection device for determining said current orientation of said device body.

8. The portable electronic device of claim 7, wherein said position detection device comprises at least one accelerometer device.

9. The portable electronic device of claim 1, wherein said display driver device is further configured for receiving at least one user-defined signal, said display driver device configured to select a default orientation associated with said user-defined signal irrespective of said current orientation and said first and second presence signals.

10. The portable electronic device according to claim 1, wherein said first and second particular accessories include a device holster and a speaker/microphone headset.

11. A method for operating a portable electronic device comprising a device body having at least one accessory interface, a first display device positioned on an first exterior of the device body, a second display device positioned on a second exterior surface of the device body which is adjacent to said first exterior surface and is oriented transverse to said first exterior surface, a display driver device communicatively coupled to the second display device and configured for receiving data for presentation on said second display device and generating signals for causing the data to be presented on the second display device, at least a first accessory detection device comprising at least one accessory sensor, said accessory detection device being communicatively coupled to said display driver device and said accessory interface, and at least a second accessory detection device communicatively coupled to said display driver device, the method comprising:
ascertaining a current orientation of said device body;
generating, in the first accessory detection device, a first presence signal exclusively indicating the presence or absence of a first particular accessory coupled to said accessory interface;
generating in the second accessory detection device a second presence signal indicating the presence or absence of a second particular accessory which is being used with said portable electronic device; and
selecting one orientation from a plurality of pre-defined orientations for said data on said second display device based on a current orientation of said device body, said first presence signal and said second presence signal.

12. The method of claim 11, wherein responsive to said first presence signal indicating the presence of said first particular accessory currently coupled to said accessory interface, and said second presence signal indicating the presence of said second particular accessory, said selecting further comprises selecting said one orientation associated with said currently coupled first particular accessory and said second particular accessory.

13. The method of claim 11, wherein said first presence signal generating step further comprises:
monitoring at least one electrical parameter of at least one electrical load device in said device body configured to vary in response to said first particular accessory being coupled to said accessory interface; and
providing signals indicating the presence of said first particular accessory in response to said change in said electrical parameter.

14. The method of claim 11, wherein said first presence signal generating step further comprises:
monitoring a current state of at least one switch configured to change from a first state to a second state in response to said first particular accessory being coupled to said accessory interface; and
providing signals indicating the presence of said first particular accessory in response to said current state changing from said first state to said second state.

15. The method of claim 11, wherein responsive to said first presence signal indicating the absence of said first particular accessory at said accessory interface, and said second presence signal indicating the absence of said second particular accessory, said selecting further comprises selecting said one orientation associated with said current orientation of said device body.

16. The method of claim 11, further comprising monitoring for a user-defined signal, and wherein said selecting further comprises selecting a default orientation associated with said user-defined signal irrespective of said current orientation and said first and second presence signal in response to said user-defined signal.

17. The method according to claim 11, wherein said first and second particular accessories are selected to include a device holster and a speaker/microphone headset.

18. A portable communications device, comprising:
- a device body having at least one accessory interface;
- a first display device positioned on a first surface of the device body;
- a second display device positioned on a second surface of the device body, said first surface adjacent to and transverse to said second surfaces;
- a display driver device communicatively coupled to the second display device and configured for receiving data for presentation on said second display and generating signals for causing the data to be presented on the second display;
- at least one electrical load device communicatively coupled to said display driver device and said accessory interface, said electrical load device configured for generating a first presence signal exclusively indicating the presence or absence of a first particular accessory coupled to said accessory interface;
- an accessory detection device communicatively coupled to said display driver device configured for generating a second presence signal indicating the presence or absence of a second particular accessory which is being used with said portable communication device; and
- at least one accelerometer device disposed within said device body and communicatively coupled to said display driver, said accelerometer device configured for providing at least one position signal indicative of an current orientation of said device body, wherein said display driver device selects one orientation from a plurality of pre-defined orientations for said data on said second display device based at least on a current orientation of said device body, said first presence signal, and said second presence signal.

19. The communications device of claim 18, wherein responsive to said first presence signal indicating the presence of at least one accessory currently coupled to said accessory interface, said display driver selects said one orientation associated with said currently coupled first particular accessory irrespective of said position signal.

20. The communications device of claim 18, wherein responsive to said first presence signal indicating the absence of said first particular accessory at said accessory interface, said display driver selects said one orientation associated with said position signal.

21. The communications device of claim 18, wherein at least one electrical parameter of said electrical load device is configured to change in response to an associated first particular accessory being currently coupled to said accessory interface, and said display driver selects said one orientation associated with said first particular accessory.

22. The communications device of claim 18, further comprising at least one user interface for providing at least one user-defined signal to said display driver, said display driver configured to select a default orientation associated with said user-defined signal irrespective of said current orientation and said status of said accessory interface.

23. The portable communications device according to claim 18, wherein said first and second particular accessories include a device holster and a speaker/microphone.

* * * * *